United States Patent [19]
Nagashima et al.

[11] Patent Number: 5,847,039
[45] Date of Patent: Dec. 8, 1998

[54] LIQUID CRYSTALLINE POLYESTER RESIN COMPOSITIONS

[75] Inventors: Tohru Nagashima; Hideo Nomura, both of Tsukuba; Tadayasu Kobayashi, Toyonaka, all of Japan

[73] Assignee: Sumitomo Chemical Company, Limited, Osaka, Japan

[21] Appl. No.: 659,915

[22] Filed: Jun. 7, 1996

[30] Foreign Application Priority Data

Jun. 9, 1995 [JP] Japan .................................. 7-143078

[51] Int. Cl.⁶ .............................. C08J 5/10; C08K 3/18; C08K 3/22; C08L 67/00
[52] U.S. Cl. ........................... 524/432; 524/430; 524/433
[58] Field of Search ................... 524/430, 432, 524/433

[56] References Cited

U.S. PATENT DOCUMENTS

| | | | |
|---|---|---|---|
| 4,458,039 | 7/1984 | Eickman | 523/216 |
| 5,268,414 | 12/1993 | Nakai et al. | 524/539 |
| 5,529,716 | 6/1996 | Nomura et al. | 252/299.01 |

FOREIGN PATENT DOCUMENTS

| | | |
|---|---|---|
| 03 05846A2 | 3/1989 | European Pat. Off. . |
| 05 04426A1 | 9/1992 | European Pat. Off. . |
| 56-026913 A | 3/1981 | Japan . |
| 56-115355 A | 9/1981 | Japan . |
| 59-058052 A | 4/1984 | Japan . |
| 59-164360 A | 9/1984 | Japan . |
| 61-120855 A | 6/1986 | Japan . |
| 62-192458A | 8/1987 | Japan . |
| 01 311172 | 12/1989 | Japan . |
| 03059066A | 3/1991 | Japan . |
| 06057117A | 3/1994 | Japan . |

*Primary Examiner*—James J. Seidleck
*Assistant Examiner*—U. K. Rajguru
*Attorney, Agent, or Firm*—Birch, Stewart, Kolasch & Birch, LLP

[57] ABSTRACT

A liquid crystalline polyester resin composition includes 0.1–50 parts by weight of at least one or more inorganic compounds selected from oxides, peroxides, double oxides and hydroxides of calcium, sodium, barium or zinc added to 100 parts by weight of a liquid crystalline polyester. The invention provides a liquid crystalline polyester resin composition from which a very small amount of corrosive gas is generated when molded into a product. The composition exhibits mechanical strength and heat resistance essentially present in the liquid crystalline polyester resin and is suitable for electrical or electronic parts.

14 Claims, No Drawings

LIQUID CRYSTALLINE POLYESTER RESIN COMPOSITIONS

BACKGROUND OF THE INVENTION

1. Field of the Invention

The present invention relates to a liquid crystalline polyester resin composition from which a very small amount of corrosive gas is generated when molded into a product and which is suitable for electric or electronic parts.

2. Description of the Related Art

Liquid crystalline polyesters remain a little entangled even in a molten state due to the rigidity of the molecule, form polydomains having a liquid crystalline state, exhibit a behavior in which the molecular chains are oriented along the direction of flow under shearing and are generally called molten-type liquid crystal (thermotropic liquid crystal) polymers. Because of this specific behavior, they are excellent in melt-flowability, have a high deflection temperature under load and continuous use temperature depending on their structure and do not cause deformation or foaming even at a molten solder temperature of 260° C. or higher.

These facts allow a resin composition comprising a liquid crystalline polyesters and a fibrous reinforcing material, typically a glass fiber, an inorganic filler, typically talc, a heat stabilizer and so on filled therein to be a material, suitable for electric or electronic parts of a thin-walled shape or a complicated shape, and used, for example, for parts for relay, coil bobbins, connectors, parts for volume controls, commutators, parts for motors and the like.

The liquid crystalline polyester, however, generally requires a high temperature for molding. Therefore, the liquid crystalline polyester resin composition produces gas by decomposition on molding and a part of the gas may be trapped in a molded product and may cause various problems during use of the product, depending on the kind of the electrical or electronic parts. Particularly, when the electronic parts are relays (cases, bases, armatures, coil bobbins and the like), the trapped gas, particularly a corrosive gas such as acetic acid or the like as its component, if generated from the product even in a very small amount, may condense around metal contacts and cause insulation failure by carbonization due to repeated arc formation on opening and closing a circuit or by corroding metal contacts.

Further, when used for electronic parts for surface mounting, the corrosive gas trapped in the molded product is liable to be liberated from the molded product due to high temperatures of 250° C. or more applied in a reflowing step in soldering and may cause corrosion of other electronic parts mounted around it.

In applications, such as encapsulation molding of a relay coil, IC chip and the like, in which particularly high flowability is required, a liquid crystalline polyester having a molecular weight controlled at a lower level may be used. In this case, problems as described above may arise during use of a finished product because of the remaining increased amount of corrosive gas component including compounds produced in the course of the synthesis of the polymer, such as for example, acetic acid, benzoic acid or the like, in the polymer.

It has been confirmed, by gas chromatography or mass spectroscopy, that the gas generated from the liquid crystalline polyester resin composition is a low temperature-boiling substance such as an aromatic hydrocarbon, an aliphatic hydrocarbon, acetic acid or phenol. Said generated gas is a gas originated from the liquid crystalline polyester, various fillers and treating agents therefor or various stabilizers and considered to be generated by heat decomposition on molding and trapped in the molded product. In many cases the main component of the gas generated from the molded product of said liquid crystalline polyester resin composition having a good flowability is acetic acid. The detailed mechanism of generation, however, has not been elucidated.

On the other hand, as a means for decreasing the amount of gas generated from the liquid crystalline polyester resin composition, JP-A-6-57117 disclosed a method in which an activated carbon or a specific zeolite was included in a liquid crystalline polyester resin composition. While the liquid crystalline polyester resin composition containing an activated carbon or a specific zeolite has indeed an effect of decreasing a low temperature-boiling component in the generated gas, it has been confirmed that the composition has only an insufficient effect in decreasing acetic acid, as described in Comparative Examples in this specification.

Further, JP-B-5-71630 disclosed a method in which a specific aluminum oxide and magnesium oxide were mixed to a thermotropic liquid crystal polymer, in order to improve heat conductivity of the thermotropic liquid crystalline polyester resin composition. However, there is no description about the effect of decreasing the amount of the generated gas.

SUMMARY OF THE INVENTION

The object of the present invention is aimed to provide a liquid crystalline polyester resin composition from which very small amount of corrosive gas is generated when molded into a product, which has a mechanical strength and heat resistance essentially present in the liquid crystalline polyester resin and which is suitable for electric or electronic parts.

As the result of extensive research for solving the above problems, the present inventors have discovered that the above object can be attained by adding at least one or more compounds selected from oxides, peroxides, double oxides and hydroxides of calcium, sodium, barium or zinc to a liquid crystalline polyester resin and thus successfully completed the present invention.

Accordingly, the present invention relates to a liquid crystalline polyester resin composition comprising 0.1–50 parts by weight of at least one or more compounds selected from oxides, peroxides, double oxides and hydroxides of calcium, sodium, barium or zinc added to 100 parts by weight of a liquid polyester.

DETAILED DESCRIPTION OF THE INVENTION

The liquid crystalline polyester for use in the present invention is a polyester called thermotropic liquid crystalline polyester including:

(1) those composed of a combination of an aromatic dicarboxylic acid, an aromatic diol and an aromatic hydroxy carboxylic acid;

(2) those composed of different kinds of aromatic hydroxy carboxylic acids;

(3) those composed of an aromatic dicarboxylic acid and a nucleus-substituted aromatic diol;

(4) reaction products of a polyester such as polyethylene terephthalate or the like and an aromatic hydroxy carboxylic acid; and the like, which form anisotropy melt at a temperature of 400° C. or below.

In place of said aromatic dicarboxylic acid, aromatic diol and aromatic hydroxy carboxylic acid, an ester-forming derivative thereof may be used.

Examples of repeating structural units in said liquid crystalline polyester include, without limitation, the units listed below.

Repeating structural units derived from an aromatic hydroxy carboxylic acid:

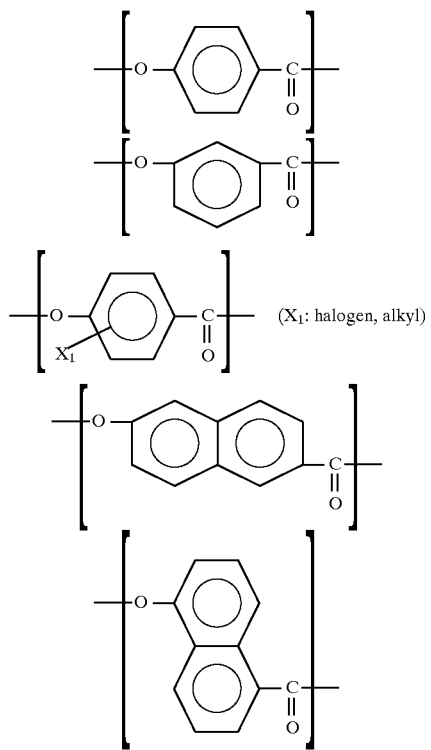

Repeating structural units derived from an aromatic dicarboxylic acid:

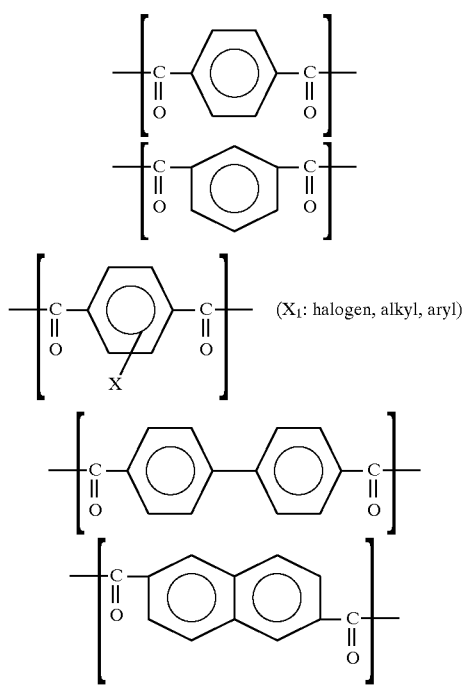

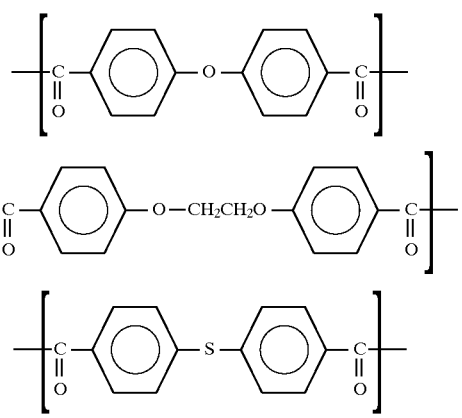

Repeating structural units derived from an aromatic diol:

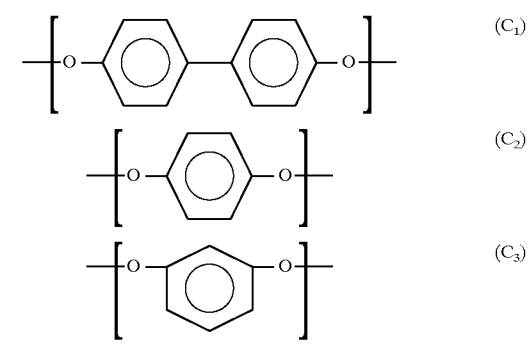

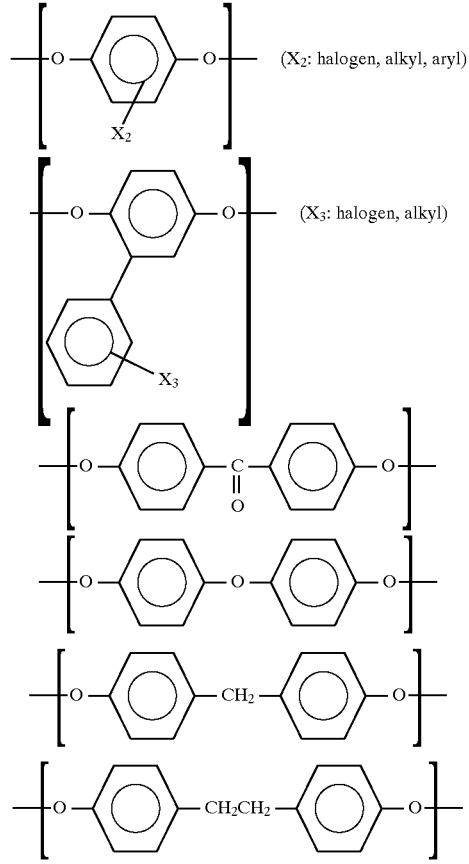

-continued

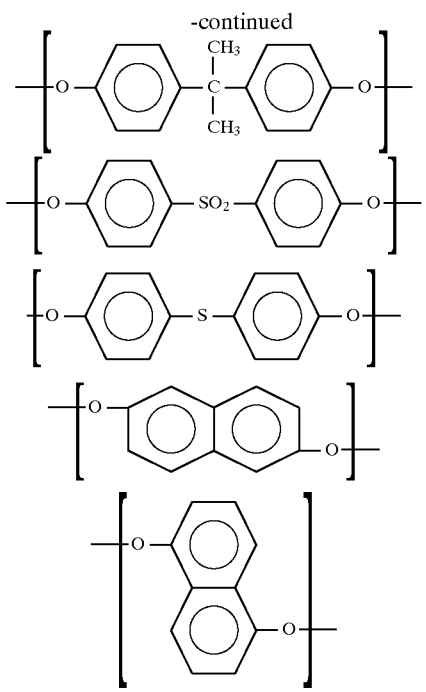

A liquid crystalline polyester having a particularly preferred balance among heat resistance, mechanical properties and processability has at least 30% by mole of a repeating structural unit represented by the following formula ($A_1$):

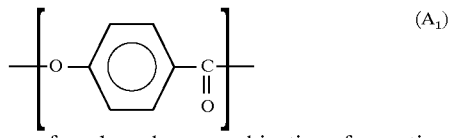

Specifically, preferred one has a combination of repeating structural units of the formulation (a)–(f) shown below.

(a): ($A_1$), ($B_1$) or a mixture of ($B_1$) and ($B_2$), ($C_1$).
(b): ($A_1$), ($A_2$).
(c): In the combination (a) of repeating structural units, a part of $A_1$ is replaced by $A_2$.
(d): In the combination (a) of repeating structural units, a part of $B_1$ is replaced by $B_3$.
(e): In the combination (a) of repeating structural units, a part of $C_1$ is replaced by $C_3$.
(f): To the combination (b) of repeating structural units, the repeating structural units $B_1$ and $C_2$ are further added.

Flow temperature, as measured by a method described below, of these liquid crystalline polyester is preferably 200° C.–400° C. and more preferably 250° C.–350° C. If the flow temperature is higher than 400° C., moldability is inferior and if the flow temperature is lower than 250° C., heat resistance is insufficient.

The liquid crystalline polyesters (a) and (b) as the basic structure are described, for example, in JP-B-47-47870, JP-B-63-3888 and others.

The inorganic compounds used in the present invention including oxides, peroxides, double oxides and hydroxides of calcium, sodium, barium or zinc may be, for example, calcium oxide, barium oxide, zinc oxide, barium peroxide, zinc peoxide, calcium silicate (wollastonite), barium titanate, sodium hydroxide, zinc hydroxide, calcium hydroxide or the like. Specifically, calcium oxide and calcium hydroxide are preferred and calcium oxide is more preferred.

For example, calcium oxide is available, without limitation, from Wako Pure Chemical Industries, Ltd. as a reagent grade calcium oxide (99.9%) having an average particle diameter of 13.2 μm or from Inoue Lime Industries, Ltd. in the trade name of VESTA PP having an average particle diameter of 9.6 μm. Zinc oxide is available from Sakai Chemical Company, Ltd. as a first grade zinc white having an average particle diameter of 0.3 μm or as FINES-50 (trade name) having an average particle diameter of 0.02 μm.

At least one or more inorganic compounds selected from oxides, peroxides, double oxides and hydroxides of calcium, sodium, barium or zinc used in the present invention preferably has a water absorption of 2% or less. The water absorption is more preferably 1.5% or less and most preferably 1% or less. The one having a water absorption of higher than 2% can be suitably used if said absorption is lowered to 2% or less by dehydrating by means of heating, placing under reduced pressure or the like. The water absorption of more than 2% is not preferred because the effect of decreasing the amount of corrosive gas generated from the molded product is insufficient and granulating properties is inferior.

The amount of said inorganic compound to be added is 0.1–50 parts by weight, preferably 0.2–30 parts by weight and more preferably 0.3–20 parts by weight, based on 100 parts by weight of the liquid crystalline polyester resin. If the amount is less than 0.1 part by weight, little effect of decreasing the amount of corrosive gas generated from the molded product is obtained. The amount more than 50 parts by weight is not preferred because the effect of decreasing the amount of corrosive gas generated from the molded product is not proportionally improved but the mechanical properties and heat resistance of the molded product are lowered and granulation becomes difficult due to insufficient entangling of the resin mixture to an extruder and improper taking off of the extruded strand.

Said inorganic compound used in the present invention preferably has an average particle diameter of 0.01 μm–100 and more preferably of 0.1 μm–50 μm. The average particle diameter less than 0.01 μm is not preferred because the inorganic compound aggregates in the course of granulating the composition. Also, the average particle diameter more than 100 μm is not preferred because the effect of decreasing the amount of corrosive gas generated from the molded product is insufficient due to decreased surface area per weight of the inorganic compound.

In the present invention, one or more kinds of fibrous or needlelike reinforcing materials such as glass fiber, silica alumina fiber, alumina fiber, carbon fiber, aluminum borate whisker and the like, inorganic fillers such as talc, mica, clay, glass bead and the like, mold release accelerator such as fluorine resin, metal soap and the like, colorant such as dye, pigment and the like, or usual additives such as antioxidant, heat stabilizer, ultraviolet absorber, antistatic agent, surfactant and the like. Particularly, addition of a filler having a property of adsorbing lower molecular compound, such as zeolite, activated carbon or the like, to the liquid crystalline polyester resin composition of the invention is effective in decreasing the amount of all kinds of gas including the corrosive gas generated from the molded product.

Further, the composition may contain one or more kinds of thermoplastic resins, in a small amount, such as polyamide, polyester, polyphenylene sulfide, polyether ketone, polycarbonate, polysulfone, polyphenylene ether or its modification product, polyether imide and the like or thermosetting resins, in a small amount, such as phenol resin, epoxy resin, polyimide resin and the like.

Means of compounding the materials for obtaining the resin composition of the present invention is not limited. A generally adopted one is a method in which a liquid crystalline polyester, at least one or more compounds selected from oxides, peroxides, double oxides and hydroxides of calcium, sodium, barium or zinc and, if necessary, a reinforcing material such as a glass fiber or an inorganic filler, mold release accelerator, heat stabilizer and the like are mixed using a Henschel mixer, tumbler or the like and the mixture is melt-kneaded using an extruder. The melt-kneading may be effected by mixing all the materials in a lump and feeding to an extruder or alternatively by feeding materials including reinforcing material such as a glass fiber and an inorganic filler separately from materials mainly comprising the resin, if necessary.

The liquid crystalline polyester resin composition of the present invention can suitably be used for electric or electronic parts having a form contacting or approaching a metal, because the amount of corrosive gas generated from a molded product is very small. Such electric or electronic parts include, without limitation, parts for relay, coil bobbins, connectors, parts for volume controls, parts for motors and the like.

EXAMPLES

The Examples, shown bellow, do not limit the scope of the present invention.

Examples 1–8 and Comparative Examples 1–3

A mixture of 100 parts by weight of a liquid crystalline polyester (referred to as Liquid crystalline polyester A) having repeating structural units $A_1$, $B_1$, $B_2$ and $C_1$ described above in a molar ratio of $A_1:B_1:B_2:C_1=60:11:9:20$ and a flow temperature of 290° C., 67 parts by weight of a glass fiber (manufactured by Central Glass Co., Ltd., trade name EFH75-01) and at least one or more inorganic compounds selected from oxides, peroxides, double oxides and hydroxides of calcium, sodium, barium or zinc in a formulation shown in Table 1 were mixed in a Henschel mixer and granulated using a twin-screw extruder (manufactured by Ikegai Tekko Co., Ltd., PCM-30) at a cylinder temperature of 300° C. to give a liquid crystalline polyester resin composition. The average particle diameter of all the inorganic compound used in the Example was 0.01 $\mu$m–100 $\mu$m. In a similar way, a liquid crystalline polyester resin composition without the inorganic compound (Comparative Example 1) was prepared.

Examples 9–12 and Comparative Examples 4–6

A mixture of 100 parts by weight of a liquid crystalline polyester (referred to as Liquid crystalline polyester B) having repeating structural units $A_1$, $B_1$, $B_2$ and $C_1$ described above in a molar ratio of $A_1:B_1:B_2:C_1=60:15:5:20$ and a flow temperature of 315° C., 67 parts by weight of a glass fiber (manufactured by Central Glass Co., Ltd., trade name EFH75-01) and calcium oxide in a formulation shown in Table 2 were mixed in a Henschel mixer and granulated using a twin-screw extruder (manufactured by Ikegai Tekko Co., Ltd., PCM-30) at a cylinder temperature of 340° C. to give a liquid crystalline polyester resin composition. The average particle diameter of calcium oxide and zinc oxide used in the Example were, respectively, 9.6 $\mu$m and 0.3 $\mu$m. In a similar way, a liquid crystalline polyester resin composition without calcium oxide (Comparative Example 4) was prepared.

On granulating the resin compositions, the granulating properties were assessed by a method described below.

Further, the resin compositions were subjected to injection molding at a cylinder temperature of 310° C. (in Examples 1–8 and Comperative Examples 1–3) or 350° C. (in Examples 9–12 and Comperative Examples 4–6) according to a method described below and the amount of acetic acid released from the molded product as well as tensile strength, flexural modulus and deflection temperature under load of the molded product were measured by methods described below. The results are shown in Table 1 and Table 2.

(1) Relative amount of gas generated from the molded product

A JIS No. 1 (½) dumbbell specimen (0.8 mm in thickness) were molded from liquid crystalline polyester resin compositions using an injection molding machine (manufactured by Nissei Resin Industries, Ltd., PS40E5ASE) at a mold temperature of 130° C. and the molded product was cut into chips of 5 mm in length, 5 mm in width and 0.8 mm in thickness. Then, 4 g of the chips were precisely weighed, placed in a 25 cc vial previously washed with water and dried in a vacuum. The vial was sealed with a packing sheet of polytetrafluoroethylene and heated in a hot-air drier having a set temperature at 120° C. for 20 hours to generate gas from the molded product.

The vial was then fitted to a headspace gaschromatograph (GC-15A/HSS-3A) manufactured by Shimadzu Corporation and the gas content of the vial was injected, keeping the temperature at 120° C., into a column of 15 m in length containing DBWAX (manufactured by J&W Scientific Co.) as a packing. The temperature of the column was raised at a rate of 2° C./minute from 80° C. starting simultaneously with the start of the injection and the gas released up to the retention time of 25 minutes was examined by a detector. The detector was of FID type and the carrier gas was helium.

Based on the peak for the detected gas, the relative amount of acetic acid in the gas generated from the molded product was compared by relative amount of the peak at the retention time of acetic acid previously confirmed using the standard substance. No peak for acetic acid was obtained from a vial without chips of liquid crystalline polyester resin, i.e. an empty vial.

(2) Tensile strength

An ASTM No. 4 dumbbell specimen was molded from liquid crystalline polyester resin compositions at a mold temperature of 130° C. and measured according to ASTM D-638.

(3) Flexural modulus

A test specimen of 127 mm in length, 12.7 mm in width and 6.4 mm in thickness was molded from liquid crystalline polyester resin compositions at a mold temperature of 130° C. and measured according to ASTM D-790.

(4) Deflection temperature under load

A test specimen of 127 mm in length, 12.7 mm in width and 6.4 mm in thickness was molded from liquid crystalline polyester resin compositions at a mold temperature of 130° C. and measured according to ASTM D-648.

(5) Flow temperature

This is defined as a temperature at which the melt viscosity is 48000 poise when a resin molten with heating at a rate of 4° C./minute is extruded from a nozzle of 1 mm in inside diameter and 10 mm in length under a load of 100 kg/cm$^2$ and which is measured by a Koka flow tester CFT-500 manufactured by Shimadzu Corporation. Lower the temperature, superior the flowability of the resin.

(6) Superiority or inferiority of granulating properties

The feeding properties to a twin-screw extruder and the taking off properties of the extruded strands were compared using the liquid crystalline polyester resin compositions granulated by methods shown in Examples and Comparative examples and the composition granulated by the method of Comparative Example 1. The results are expressed by scores ○ for comparable, Δ for slightly inferior and x for clearly inferior.

from the molded product was remarkably lowered as compared with the cases of the compositions (Comparative Examples 1 and 4) in which the compound was not added. In other words, the relative amount of acetic acid generated from the molded product was clearly decreased.

TABLE 1

| | Formulation of resin composition | | | | | | | | Deflection | | |
|---|---|---|---|---|---|---|---|---|---|---|---|
| | Liquid crystalline polyester | Glass fiber (parts by weight) | Additive | | | Relative amount of corrosive gas (acetic acid) | Tensile strength (kg/cm²) | Flexural modulus (kg/cm²) | temperature under load (°C.) | Flow temperature (°C.) | Granulating properties |
| | Resin | (parts by weight) | | Kind | Water absorption (%) | Amount (parts by weight) | | | | | | |
| Comparative Example 1 | A | 100 | 67 | — | — | — | 156000 | 1300 | 128000 | 240 | 289 | o |
| Example 1 | A | 100 | 67 | Calcium oxide | 0.8 | 0.5 | 19000 | 1270 | 132000 | 241 | 291 | o |
| Example 2 | A | 100 | 67 | Calcium oxide | 0.8 | 1.7 | 1000 | 1300 | 131000 | 244 | 292 | o |
| Example 3 | A | 100 | 67 | Calcium oxide | 2.9 | 1.7 | 3000 | 1200 | 128000 | 238 | 287 | Δ |
| Example 4 | A | 100 | 67 | Calcium oxide | 0.8 | 17 | 0 | 1290 | 128000 | 240 | 293 | Δ |
| Example 5 | A | 100 | 67 | Calcium silicate | 0.7 | 8.3 | 5000 | 1210 | 136000 | 240 | 289 | o |
| Example 6 | A | 100 | 67 | Calcium hydroxide | 0.4 | 0.5 | 3000 | 1270 | 131000 | 240 | 290 | o |
| Example 7 | A | 100 | 67 | Barium oxide | 0.2 | 2.2 | 1000 | 1270 | 131000 | 240 | 290 | o |
| Example 8 | A | 100 | 67 | Zinc oxide | 0.6 | 2.2 | 1000 | 1230 | 132000 | 240 | 288 | o |
| Comparative Example 2 | A | 100 | 67 | Calcium oxide | 0.8 | 0.05 | 87000 | 1310 | 128000 | 241 | 289 | o |
| Comparative Example 3 | A | 100 | 67 | Calcium oxide | 0.8 | 67 | 0 | 880 | 84000 | 205 | 301 | x |

TABLE 2

| | Formulation of resin composition | | | | | | | | Deflection | | |
|---|---|---|---|---|---|---|---|---|---|---|---|
| | Liquid crystalline polyester | Glass fiber (parts by weight) | Additive | | | Relative amount of corrosive gas (acetic acid) | Tensile strength (kg/cm²) | Flexural modulus (kg/cm²) | temperature under load (°C.) | Flow temperature (°C.) | Granulating properties |
| | Resin | (parts by weight) | | Kind | Water absorption (%) | Amount (parts by weight) | | | | | | |
| Comparative Example 4 | B | 100 | 67 | — | — | — | 98000 | 1410 | 125000 | 283 | 315 | o |
| Example 9 | B | 100 | 67 | Calcium oxide | 0.8 | 0.5 | 11000 | 1400 | 127000 | 283 | 316 | o |
| Example 10 | B | 100 | 67 | Calcium oxide | 0.8 | 1.7 | 3000 | 1430 | 128000 | 285 | 318 | o |
| Example 11 | B | 100 | 67 | Calcium oxide | 0.8 | 17 | 0 | 1390 | 125000 | 285 | 317 | Δ |
| Example 12 | B | 100 | 67 | Zinc oxide | 0.6 | 2.2 | 4000 | 1350 | 126000 | 283 | 315 | o |
| Comparative Example 5 | B | 100 | 67 | Calcium oxide | 0.8 | 0.05 | 62000 | 1420 | 125000 | 283 | 315 | o |
| Comparative Example 6 | B | 100 | 67 | Calcium oxide | 0.8 | 67 | 0 | 800 | 79000 | 220 | 320 | x |

It can be clearly seen that in the cases of a liquid crystalline polyester resin compositions according to the present invention (Examples 1–12) in which at least one or more compounds selected from oxides, peroxides, double oxides and hydroxides of calcium, sodium, barium or zinc were added, the relative amount of acetic acid generated On the other hand, in the cases in which the added amount was less than 0.1 part by weight (Comparative Examples 2 and 5), the effect of decreasing the relative amount of acetic acid generated from the molded product was little, and in the cases in which the added amount was more than 50 parts by weight (Comparative Example 3 and 6), the effect of decreasing the relative amount of acetic acid generated from the molded product was comparable to the cases in which the added amount was 17 parts by weight (Example 4 and 11), but tensile strength and flexural modulus were remarkably decreased and granulating properties were significantly lowered. Further, in the liquid crystalline polyester resin composition in which calcium oxide having a water absorption more than 2% was compounded (Example 3), the effect of decreasing the relative amount of acetic acid generated from the molded product was somewhat lower and the granulating properties was a little inferior as compared with the liquid crystalline polyester resin composition in which calcium oxide having a water absorption of 2% or less was compounded (Example 2).

The liquid crystalline polyester resin composition according to the present invention generates corrosive gas only in a small relative amount when molded into a product, has a mechanical strength and heat resistance essentially present in the liquid crystalline polyester resin composition, has a good granulating properties and molding properties and therefore is very useful for electric or electronic parts.

What is claimed is:

1. A liquid crystalline polyester resin composition comprising 0.2–30 parts by weight of a first component of at least one or more inorganic compounds selected from oxides, peroxides, double oxides and hydroxides of calcium, sodium, barium or zinc added to a second component of 100 parts by weight of a liquid crystalline polyester, wherein the inorganic compounds have a water absorption of 2% or less.

2. The liquid crystalline polyester resin composition according to claim 1, in which the liquid crystalline polyester has at least 30% by mole of a repeating structural unit represented by the following formula ($A_1$):

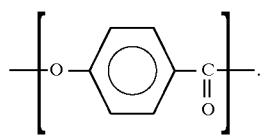
($A_1$)

3. The liquid crystalline polyester resin composition according to claim 1, wherein the first component has a water absorption of 1.5% or less.

4. The liquid crystalline polyester resin composition according to claim 1, wherein the first component is present in an amount of 0.3–20 parts by weight.

5. The liquid crystalline polyester resin composition according to claim 1, wherein the first component has an average particle diameter in the range of 0.01 microns to 100 microns.

6. The liquid crystalline polyester resin composition according to claim 1, wherein the first component has an average particle diameter in the range of 0.1 microns to 50 microns.

7. The liquid crystalline polyester resin composition according to claim 1, wherein the liquid crystalline polyester second component has repeating structural units selected from one of the following combinations:

(1) a first combination of an aromatic dicarboxylic acid unit, an aromatic diol unit and an aromatic hydroxy carboxylic acid unit;
(2) a second combination of two or more different aromatic hydroxy carboxylic acid units;
(3) a third combination of an aromatic dicarboxylic acid unit and a nucleus-substituted aromatic diol unit; and
(4) a fourth combination of the reaction product of a polyester with an aromatic hydroxy carboxylic acid unit;

wherein the aromatic hydroxy carboxylic acid unit is selected from at least one of the members of the group consisting of:

($A_1$)

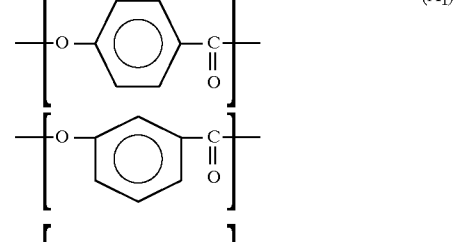

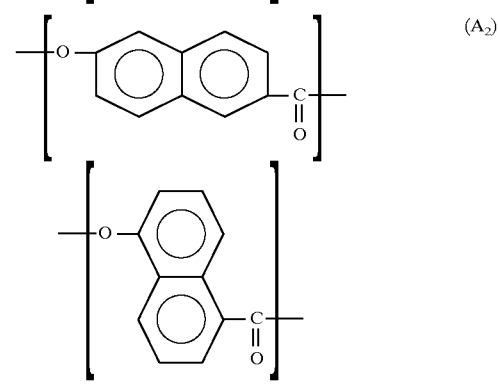
($A_2$)

wherein $X_1$ is halogen or alkyl;

wherein the aromatic dicarboxylic acid units are at least one member selected from the group consisting of:

($B_1$)

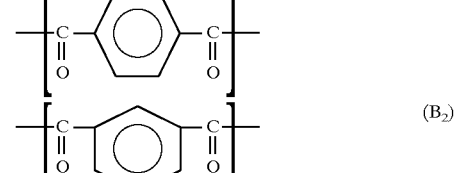
($B_2$)

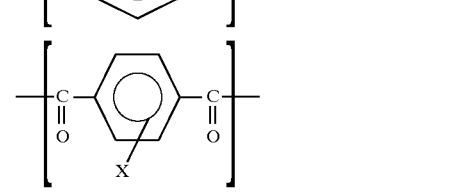

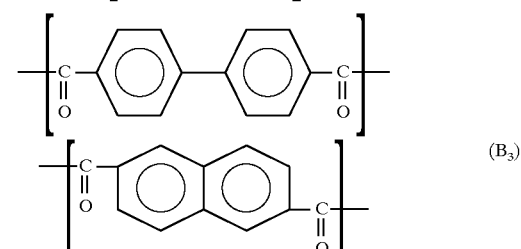
($B_3$)

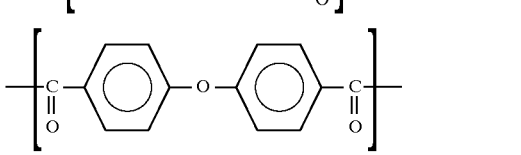

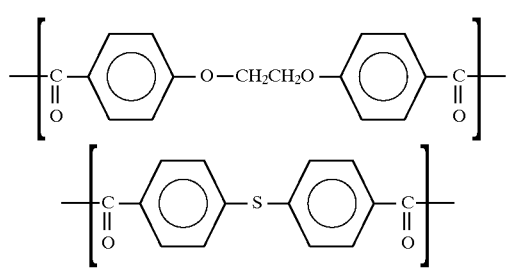

wherein X is halogen, alkyl or aryl;
and wherein the aromatic diol units are at least one member selected from the group consisting of:

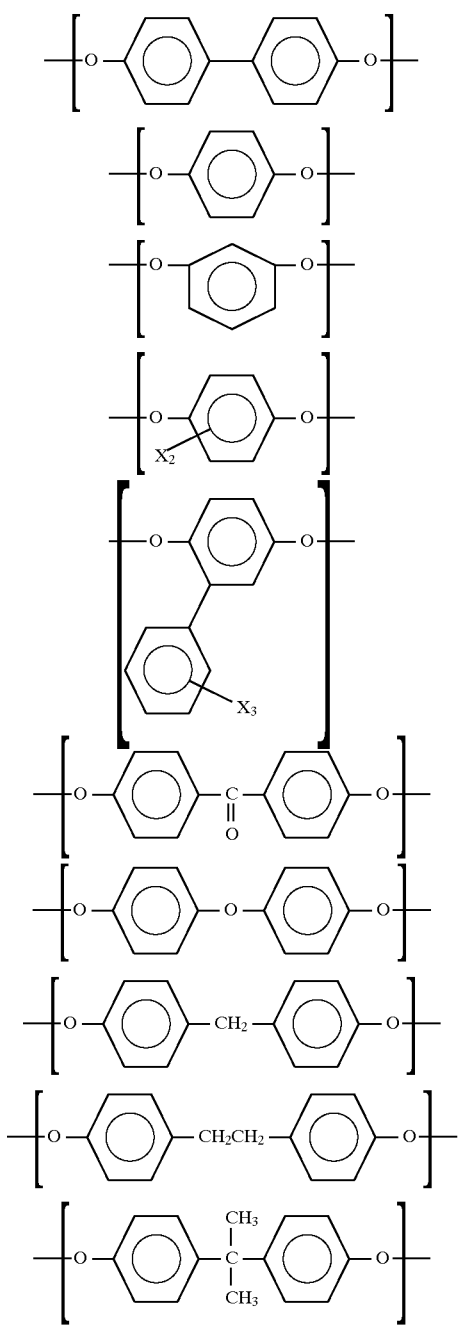

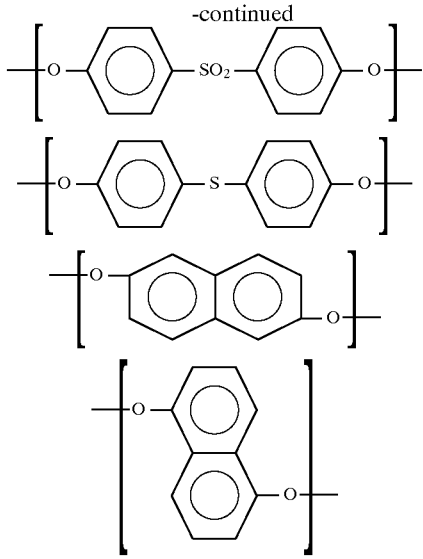

wherein $X_2$ is halogen, alkyl or aryl and $X_3$ is halogen or alkyl.

8. The liquid crystalline polyester resin composition according to claim 7, in which the liquid crystalline polyester has at least 30% by mole of a repeating structural unit represented by the following formula ($A_1$):

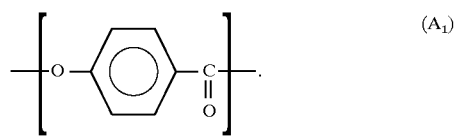

9. The liquid crystalline polyester resin composition according to claim 7, wherein the first component has a water absorption of 1.5% or less.

10. The liquid crystalline polyester resin composition according to claim 7, wherein the first component is present in an amount of 0.3–20 parts by weight.

11. The liquid crystalline polyester resin composition according to claim 7, wherein the first component has an average particle diameter in the range of 0.01 microns to 100 microns.

12. The liquid crystalline polyester resin composition according to claim 7, wherein the first component has an average particle diameter in the range of 0.1 microns to 50 microns.

13. The liquid crystalline polyester resin composition according to claim 1, wherein the first component is at least one or more inorganic compounds selected from oxides, peroxides, double oxides and hydroxides of calcium, sodium or barium.

14. The liquid crystalline polyester resin composition according to claim 7, wherein the first component is at least one or more inorganic compounds selected from oxides, peroxides, double oxides and hydroxides of calcium, sodium or barium.

* * * * *